United States Patent [19]

Cooper

[11] Patent Number: 4,881,795
[45] Date of Patent: Nov. 21, 1989

[54] HIGH COUNT OPTICAL FIBER DISTRIBUTION CABLE

[75] Inventor: Susan M. Cooper, Newton, N.C.

[73] Assignee: Siecor Corporation, Hickory, N.C.

[21] Appl. No.: 305,703

[22] Filed: Feb. 3, 1989

[51] Int. Cl.$^4$ .............................................. G02B 6/44
[52] U.S. Cl. ................................................ 350/96.23
[58] Field of Search ...................................... 350/96.23

[56] References Cited

U.S. PATENT DOCUMENTS

| | | | |
|---|---|---|---|
| 3,875,323 | 4/1975 | Bopp et al. | 174/23 |
| 4,072,398 | 2/1978 | Larsen et al. | 350/96.23 |
| 4,259,540 | 3/1981 | Sabia | 174/23 |
| 4,350,000 | 9/1982 | Schwemmer | 53/287 |
| 4,351,913 | 9/1982 | Patel | 523/218 |
| 4,550,976 | 11/1985 | Cooper et al. | 350/96.23 |
| 4,687,294 | 8/1987 | Angeles | 350/96.23 |
| 4,746,190 | 5/1988 | Oestreich et al. | 350/96.23 |

*Primary Examiner*—William L. Sikes
*Assistant Examiner*—Akm E. Ullah
*Attorney, Agent, or Firm*—Roy B. Moffitt

[57] ABSTRACT

A high count optical fiber distribution cable having a center sub-unit in the form of a single helix and an outside member in the form of a double helix configuration, the cable structure of which results in optical fiber attenuation stability of no more than 0.2 db/km variance in attenuation at the operating wavelengths of 1310 nm and 1550 nm between $-40°$ and $70°C$.; each sub-unit is composed of one or more optical fiber bearing buffer tubes or cylindrical members stranded about a sub-unit strength member, the sub-unit strength member having an elastic modulus of at least 4,350,000 psi and coefficient of thermal expansion of no more than $25 \times 10^{-6}$ Cm/Cm/°C., the buffer tubes of each sub-unit having a lay length of no less than 100 mm and the subunits themselves as a sub-unit having a lay length of 900 mm, and no less than 300 elongated optical fibers disposed in one or more of the buffer tubes of the sub-units.

11 Claims, 4 Drawing Sheets

SINGLE HELIX

DOUBLE HELIX

HIGH COUNT OPTICAL FIBER DISTRIBUTION CABLE

FIELD OF THE INVENTION

The present invention is an improved high count fiber optic distribution cable, more particularly a high count fiber optic distribution cable (at least 300 fibers) having controlled and limited expansion and contraction of its component parts over a wide ($-40°$ to $70°$ C.) temperature range resulting in an improved attenuation loss of the optical fibers over temperature range at 1310 nm and 1550 nm wavelengths.

BACKGROUND OF THE INVENTION

In a telephone system, trunk cables are those cables that connect large population centers one to another, e.g., city to city, and a central office to another central office. On the other hand, distribution cable is used in a section of the system which connects a central office to a particular subscriber. Three requirements of a fiber optic distribution cable stand out: (1) ease of fiber identification, (2) high fiber count, and (3) low attenuation loss by the fibers over a wide range, generally minus $-40+$ to $70°$ C. at 1310 and 1550 nm wavelengths. Presently, a total fiber count of 192 per cable is considered a high count fiber optic cable. For purposes of this disclosure, a high fiber count cable is one that contains at least 300 fibers in the aggregate and more particularly between 300 to 420 fibers per cable. Generally, a high count fiber optic cable for the purpose of this disclosure is one of the "loose tube" variety in which a single tube may contain 300 or more fibers or a plurality of tubes contain in the aggregate a total of 300 to 420 fibers.

A workman in preparation of connecting a fiber in a distribution cable must obviously enter the cable. If such an optical fiber cable has 300 to 420 fibers, a workman has a problem of identifying a particular fiber without wasted time. In addition, the relative expansion/contraction of the structural elements comprising a high count fiber optic cable creates a problem of cable structural stabilization between the temperatures of $-40°$ and $70°$ C. Failure to satisfactorily stabilize cable structure during contraction (cooling) of its component parts more often than not causes attenuation. See for example the teachings of U.S. Pat. No. 4,687,294, incorporated herein by reference.

A fiber optic cable of the loose tube variety, see U.S. Pat. No. 4,072,398 for example, has structural components made primarily from plastic and steel that, apart from the fibers themselves, may shrink as much as one percent (1%) when cooled from $+70°$ C. to $-40°$ C. At room temperature, fibers in prior art loose tube construction (contrary to that shown in U.S. Pat. No. 4,072,398) lie either loosely twisted or with no twisting in an uncoiled configuration generally along the neutral axis of the tube in which they are housed, generally not touching the tube interior. See FIG. 1 of this disclosure. As the tube and its fibers are cooled, the tube (generally made from plastic) shrinks causing the optical fibers in it to come in contact with the tube inner wall. Further cooling will cause the optical fibers to shape themselves into a coil like form, that more often than not comes in contact with the tube inner wall. See FIG. 2 of this disclosure. It is the bending (coil-like formation) like that of FIG. 2 that causes attenuation loss. Reversal of this process (warming the loose tube composite) relieves the bending and some of the attenuation loss brought about by cooling. It is the object of this invention to solve the problem of attenuation in high count fiber optic cable.

BRIEF DESCRIPTION OF THE INVENTION

The present invention is a high count fiber optic distribution cable having an optical fiber attenuation stability over a range of temperatures. The structure of the cable is in the form of a double helix about a single helix. The single helix is a central sub-unit and the double helix is composed of a plurality of other like sub-units stranded about the central sub-unit. The central sub-unit is in the form of a single helix, namely buffer tubes stranded about a sub-unit strength member in helical fashion. The double helix is composed of a plurality of like sub-units stranded about the central sub-unit. Each sub-unit center strength member, whether of the single or double helix, has an elastic modulus of at least 4,350,000 psi and a coefficient of thermal expansion of not more than $25 \times 10^{-6}$ Cm/Cm/$°$ C. Each sub-unit is composed of one or more, generally a plurality, of elongated buffer tubes usually made from a convenient plastic such as polyethylene, nylon, polypropylene, polyesters, and polyvinylchloride or elongated cylindrical members (sometimes referred to as dummy members) made from the plastic materials listed above stranded about a sub-unit strength member. The sub-unit strength member may be made from steel or glass reinforced plastic. Optical fibers are disposed in one or more of the sub-unit buffer tubes and in the aggregate number not less than 300 for the cable. The lay length of the buffer tubes in the central subunit is no less than 95 mm. The lay length of the buffer tubes per se of each sub-unit stranded about the central sub-unit is no less than 100 mm and the lay length of the subunits themselves is no less than 900 mm. Because of the structure of the cable, these fibers vary no more than 0.02 db/km in attenuation between $-40°$ and $70°$ C. The buffer tubes of the sub-units may be S-Z stranded if desired, as per prior art practice.

Each tube containing optical fibers is color coded and each fiber may bear a colored plastic coating thereover, which can also serve as a color coding. Each tube also contains a quantity of grease-like material, the composition of which may be petroleum or modified petroleum and which is well known and is not considered a novel part of this invention. See for example, U.S. Pat. Nos. 3,875,323; 4,351,913, and 4,259,540. The fibers and the buffer tube(s) are assembled in such a manner that the fibers lie essentially uncoiled along the neutral axis of the tube, but may be gently twisted, or not twisted at all, one around another. See FIG. 1. Severe bending of the fibers is to be avoided to maintain the attenuation loss of the fibers as low as possible.

Because of the color coding of each tube and the color coding of each fiber within each tube, each sub-unit can bear its own distinctive color coding scheme and thus provide a method of locating a particular fiber within a particular tube. Coloring schemes, which achieve such an end, are many and well known. They can be of any convenient scheme adaptable to a particular manufacturing process.

It has been found that when the sub-units are configured as disclosed, the fiber is coiled less that would otherwise be observed between the temperatures of $-40°$ and $70°$ C. thus giving rise to an attenuation loss over this particular temperature range of no greater than 0.2 db/km at the operating wavelength for single mode fiber, 1310 nm and 1550 nm, even when more than 300 fibers are in a given cable. It is a well known phenomena that attenuation can be induced into an optical fiber by bending it, i.e., forming a loop with the fiber and such attenuation can be in most cases relieved or reversed upon returning the fiber to its normal non-bent state. Cooling of the structural elements of a loose tube type fiber optic cable is believed to be the cause of a coil-like formation of the optical fiber, and the accompanying attenuation. The structure of the cable disclosed herein avoids this problem to the extent that the attenuation between −40° and +70° C. is reduced to no more than 0.2 db/km at the typical operating wavelength for single mode fiber, 1310 nm and 1550 nm.

In previously identified U.S. Pat. No. 4,687,294, there is recognition of a problem in fiber optic cable concerning thermostability. Polymeric materials used to form buffer tubes, jackets, plastic portions of the cable generally have coefficients of thermal expansion substantially higher than that of the optical fibers themselves. Without thermo stabilizing members, such plastic members would tend to produce localized distortions in the optical fibers in regions of temperature differentials, which result in significant attenuation of a signal. Differential shrinkage causes the optical fibers to be bent into a coil and such bending causes the attentuation loss.

The prior art (U.S. Pat. No. 4,687,294) teaches a strength member that is rigid and has a temperature coefficient close to that of an optical fiber. A rigid strength member formed of steel cable, fiber glass, fiber glass reinforced epoxy rod, or polymer-coated fiber glass yarns is taught to have the tendency to control the thermoexpansion and concentration of the cable as a whole. It is further taught that glass fibers typically have a coefficient of thermal expansion in the range from about $0.05 \times 10^{-6}$ to about $0.1 \times 10^{-6}$ CM/CM/°C. and a rigid strength member may have a coefficient of thermal expansion of about $0.2 \times 10^{-6}$ to about $15 \times 10^{-6}$ CM/CM/°C., preferably from about $0.5 \times 10^{-6}$ to $13 \times 10^{-6}$. This patent also teaches that these ranges compare favorably to the coefficients of thermal expansion of the polymeric material used to form the various layers of cable, which typically have coefficients of thermal expansion upwards about $100 \times 10^{-6}$ CM/CM/°C. to $200 \times 10^{-6}$ CM/CM/°C.

U.S. Pat. No. 4,687,294 also teaches a fiber optic cable that has a practical upper limit of 8 fibers; however, for convenience of installation, this patent teaches that two are preferred. Thus, even though the prior art recognizes the problem that fiber optic cables have arising out of the difference between the thermal coefficients of thermal expansion between the optical fibers and the other components of the cable, the prior art recognize that practical upper limits for optical fibers was about 8, not the 300 and greater as envisioned by the present invention. Notwithstanding the upper limit of 8 as disclosed in U.S. Pat. No. 4,687,294, applicant has seen fiber optic cables having up to 192 fibers, but no higher.

U.S. Pat. No. 4,746,190, incorporated herein by reference, discloses the concept of a central strength member around which a plurality of buffer tubes containing optical fibers are stranded forming a sub-unit. Such is shown in FIG. 2 of this patent. Also shown is the concept of taking a plurality of sub-units and stranding them about a central strength member. This patent, however, is concerned with reverse and S-Z stranding of the buffer tubes themselves and with the sub-units around a central strength member. There is no teaching or suggestion in this prior art of a single helix, double helix type cable, comprising a single helix center sub-unit and a double helix comprising sub-units stranded about the center sub-unit and that center strength members of the sub-units have like coefficients of thermal expansion and tensile strength. Nor is there any disclosure regarding the lay length of the buffer tubes themselves and the subunits. Furthermore, even though the teachings of U.S. Pat. No. 4,746,190 relate to fiber optic cable, which may be used as distribution cable, it was not recognized or taught that over 300 fibers, in the aggregate, could be placed in the buffer tubes and maintain attenuation loss in the fibers to no more than 0.2 db/km at the wavelength of operation, 1310 nm and 1550 nm over a temperature range of −40° to 70° C.

DETAILED DESCRIPTION OF THE INVENTION

Figure 1:
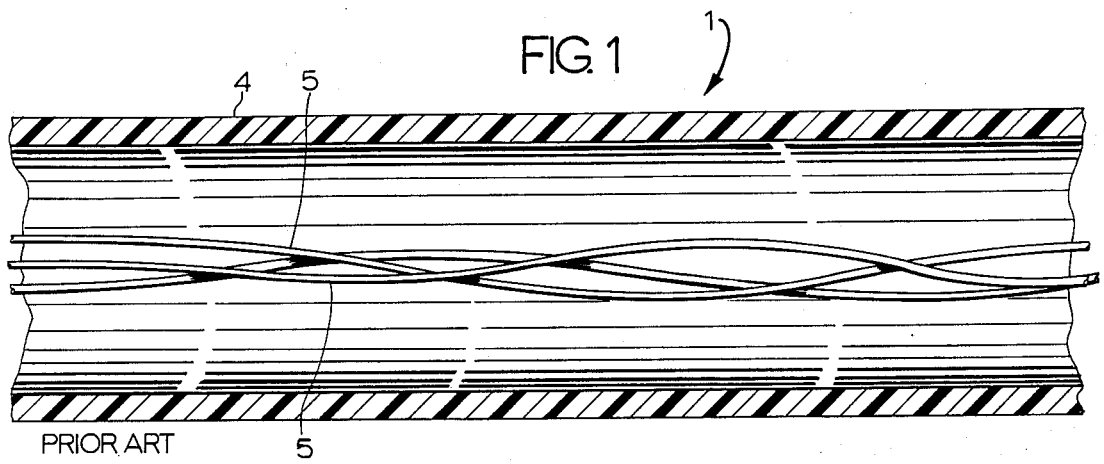
FIG. 1 is a longitudinal cross sectional view of a prior art buffer tube with loosely twisted optical fibers disposed along the tube's neutral axis.
Figure 2:
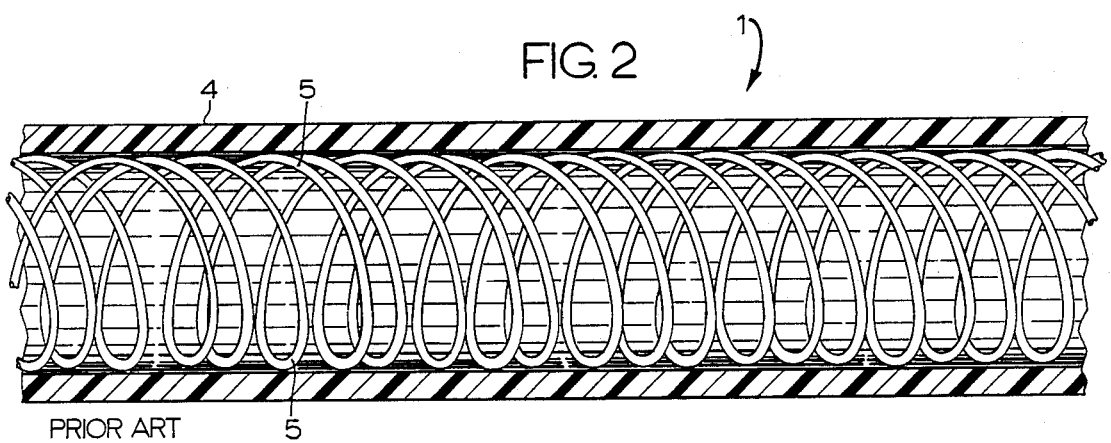
FIG. 2 is a view of the tube of FIG. 1 after cooling to about −40° C. showing the optical fibers in a coiled configuration.

Element 1 of FIG. 1 is a prior art optical fiber buffer tube 4 containing optical fibers 5, at room temperature. It will be noted that optical fibers 5 are in a relaxed, loosely twisted state. Shown in FIG. 2 is element 1 of FIG. 1 at reduced temperatures, for example minus 40° C. At this temperature, buffer tube 4 has shrunk. As a result of the differential coefficient of thermal expansion between the materials used for buffer tube 4 and optical fibers 5, the optical fibers 5 of FIG. 1 have become coiled. It is a well known phenomena that such a bending or coiling increases attenuation.

Figure 3:
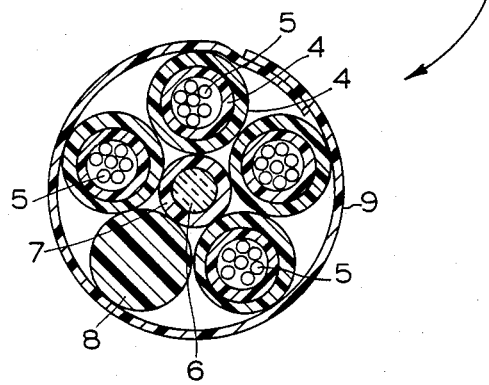
FIG. 3 is a detailed cross sectional view transverse to the longitudinal axis of a sub-unit of the fiber optic cable of the invention, comprising buffer tubes and a "dummy" tube.

Element 2 of FIG. 3 is a sub-unit (the building block) of the disclosed invention. This sub-unit is composed of a strength member 6 of any convenient material, such as steel, or fiberglass reinforced epoxy that has an elastic modulus of at least 4,350,000 psi and a coefficient of thermal expansion of no more than $25 \times 10^{-6}$ Cm/Cm/°C. Strength member 6 may or may not be circumscribed by plastic member 7. Disposed on the outer surface of plastic member 7 is a plurality of buffer tubes 4, each delimiting a cavity in which optical fibers 5 were disposed. It will be noted that tube 4, as shown in FIG. 3 has a dual layer, rather than a single layer. A dual layer such as shown in FIG. 3 is an alternative embodiment to a single layer as shown in FIGS. 1 and 2. Element 8 is an elongated plastic member, a "dummy" member, that merely takes up space and completes the concentrical nature of the cable elements as a composite. See for example the teachings in U.S. Pat. No. 4,550,976, incorporated herein by reference. Surrounding elements 8 and tubes 4 is jacket 9, made of any convenient plastic material such as polyethylene, polyethylene terapthallate, polyesters or polyvinylchloride. Jacket 9 should be optional. Preferred embodiment without the jacket.

Figure 4:
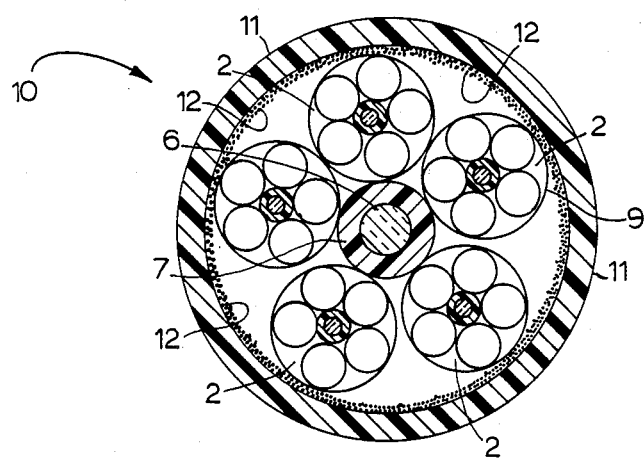
FIG. 4 is a cross sectional view transverse to the longitudinal axis of a prior art loose tube fiber optic cable.

Shown by element 10 of FIG. 4 is a cross-sectional view of a prior art loose tube fiber optic cable. Cable 10 is composed of central strength member 6, circumscribed by a plastic coating 7. Disposed on the surface of plastic covering 7 of central strength member 6 are a plurality (in this case 5) sub-units 2. Circumscribing sub-unit 2 is a binder tape 9 and these are circumscribed by jacket 11 (made from any convenient plastic material). Disposed between sub-units 2 are additional flexible strength members such as aramid fibers 12.

Figure 5:
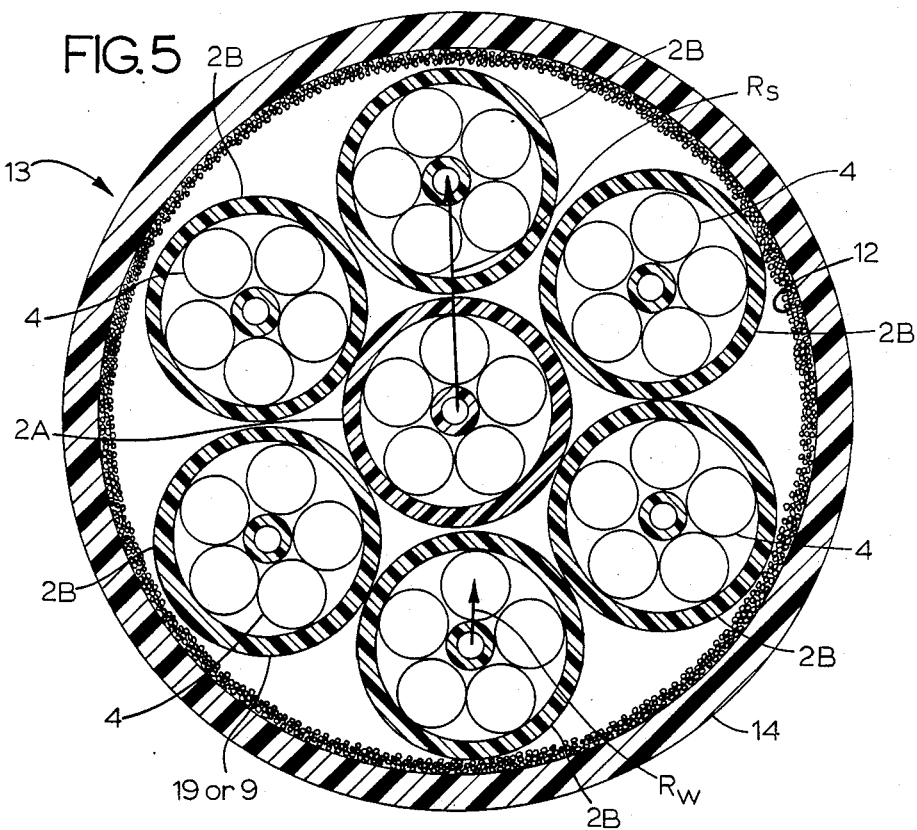
FIG. 5 is a cross sectional view, transverse to the longitudinal axis, of the preferred embodiment of the invention, containing central sub-unit about which a plurality of other sub-units are stranded to form a double helix.
Figure 7:
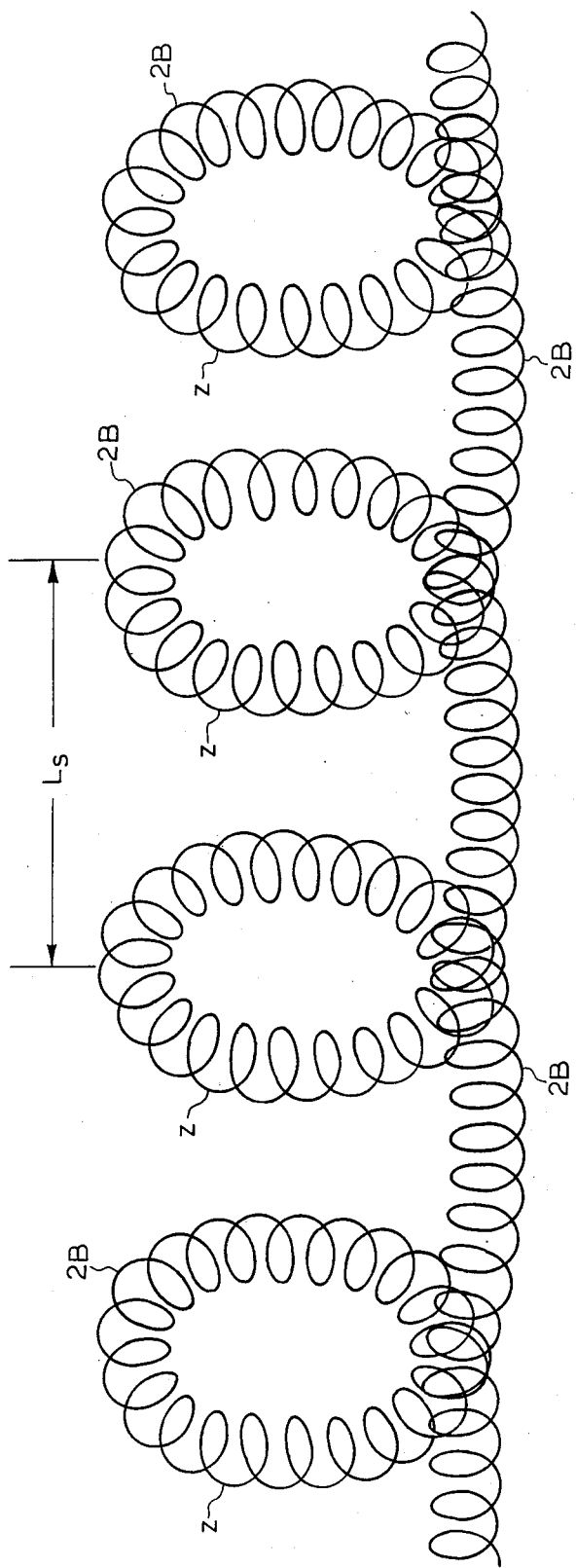
FIG. 7 is a schematic representation of the double helix formation employing sub-units 2 of FIG. 3.

Element 13 of FIG. 5 shows the preferred embodiment of the invention composed of a central sub-unit member 2A circumscribed by a plurality (six in number) like sub-units 2B, circumscribed by plastic jacket 14. In this embodiment, the central sub-unit 2A itself is an unstranded sub-unit 2 (FIG. 3) its buffer tubes being stranded and forming a single helix (See FIG. 3). Sub-units 2B are stranded sub-units 2 and their buffer tubes thus form a double helix when sub-units 2B are stranded about central sub-unit 2A. See FIG. 7. The central strength member 6 of each sub-unit 2, 2A, or 2B has the tensile strength and coefficient of thermal expansion as above described. Jacket 19 may be replaced by tape or binder 9 as desired. Using a tape or binder results in a cheaper and more compact cable.

Figure 6:
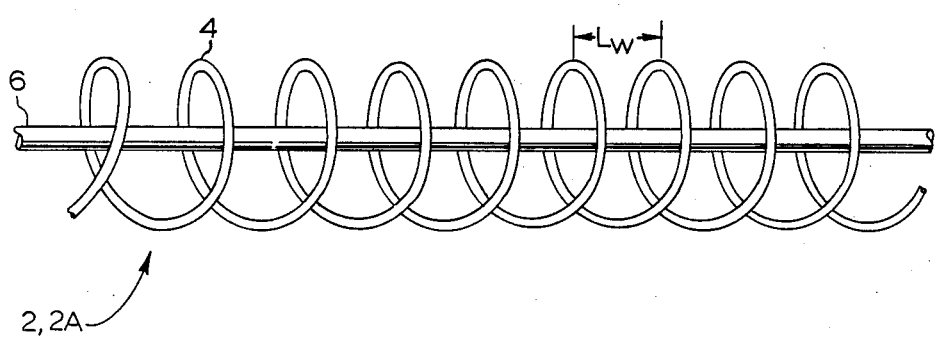
FIG. 6 is a schematic representation of the single helix center sub-unit 2 of FIG. 3.

The manufacture of element 13 of FIG. 5, the preferred embodiment of the invention, employs the following procedure. Sub-unit 2 is provided and is used as a central sub-unit 2A. Central sub-unit 2A has buffer tubes in the form of a single helix like that shown in FIG. 6. About this central sub-unit 2A, a plurality of sub-units 2B are stranded the buffer tubes forming a double helix. See for example, the double helix of FIG. 7, denoted by element 2B. For instance, a single helix of FIG. 6 (2B) is stranded about single helix 2A of FIG. 6, forming the double helix configuration for the outside sub-units 2B shown in FIG. 5 as element 13. The central strength member 6 of each sub-unit 2, (2A or 2B) has the same minimum characteristics described above and the aggregate number of optical fibers in the buffer tubes of sub-units 2A and 2B is a minimum of 300. Temperature cycling of such a single-helix/double helix configuration between −40° C. and 70° C. yielded data that indicated that the average variance in db/km was 0.02 db/km, at operating wavelengths of 1310 nm and 1550 nm. A summary of the test results of a fiber optic cable made according to the disclosed invention and containing 300 fibers cycled through −40° to +70° C. is set forth below:

(a) Number of Samples: 24
(b) Average Variances: 0.02 db/km
(c) Average +3 Standard Deivations: 0.117 db/km
(d) Average −3 Standard Deviations: 0.077 db/km
(e) Maximum: 0.14 db/km
(f) Minimum: 0.0 db/km

PATH DESCRIPTION OF A DOUBLE HELIX $x(\theta) = (R_s + R_w \cos(\phi)) \cos(\theta) + R_w \sin(\phi) \cos(\beta) \sin(\theta)$ $y(\theta) = (R_s + R_w \cos(\phi)) \sin(\theta) - R_w \sin(\phi) \cos(\beta) \cos(\theta)$ $z(\theta) = R_s \theta \cot(\beta) + R_w \sin(\beta) \sin(\phi)$ where:
$R_s$ = radius of subunit center line measured from axis of cable
$R_w$ = radius of buffer tube center line measured from subunit center line
$\phi = a\theta + \phi_0$
$a = -R_s \tan(\alpha)/R_w \sin(\beta)$
$\delta$ = layangle of the buffer tubes = $\tan^{-1}(2\pi R_w/L_w)$
$\beta$ = layangle of the subunits in the cable = $-\tan^{-1}(2\pi R_s/L_s)$
$L_w$ = laylength of buffer tubes in subunit
$L_s$ = Laylength of subunits in cable
$\phi_0$ = dummy variable

EXAMPLE

For a cable containing 420 fibers:
$R_s = 8.6$ mm
$R_w = 2.775$ mm
$L_s = 900$ mm
$L_w = 100$ mm
$\delta = \tan^{-1}(2\pi(2.775)/100) = 9.891$
$\beta = \tan^{-1}(2\pi(8.6)/900) = 3.436$ $$ROC(0) = \frac{\left[2.775 + 8.6\left(1 + \frac{\tan(9.891)}{\tan(3.436)}\right)\right]^2 + [8.6(\cot(3.436) - \tan(9.981))]^2}{\left[2.775 + \frac{\tan^2(9.891)\, 8.6^2}{\sin^2(3.436)\, 2.775} + 8.6\left(2\frac{\tan(9.891)}{\tan(3.436)} + 1\right)\right]}$$

$$= \frac{1321.336 + 20088.725}{228.364 + 58.550}$$

$$= 74.6 \text{ mm}$$

DERIVATIONS FOR RADIUS OF CURVATURE

Rectangular Coordinates for the path description of a double helix as shown above:

$x(\theta) = (R_s + R_w \cos(\phi)) \cos(\theta) + R_w \sin(\phi) \cos(\beta) \sin(\theta)$ $y(\theta) = (R_s + R_w \cos(\phi)) \sin(\theta) - R_w \sin(\phi) \cos(\beta) \cos(\theta)$ $z(\theta) = R_s \theta \cot(\beta) + R_w \sin(\beta) \sin(\phi)$ $\vec{f}(\theta)$ is the vector describing the path of the double helix:

$\vec{f}(\theta) = x(\theta)\hat{i} + y(\theta)\hat{j} + z(\theta)\hat{k}$ $\vec{f'}(\theta) = \frac{d\vec{f}(\theta)}{d\theta} = \frac{dx(\theta)}{d\theta}\hat{i} + \frac{dy(\theta)}{d\theta}\hat{j} + \frac{dz(\theta)}{d\theta}\hat{k}$ $\frac{ds}{d\theta} = |\vec{f'}(\theta)|$ The unit tangent vector to the vector $\vec{f}(\theta)$ (ie the double helix) is defined as:

$$\hat{T}(\theta) = \frac{\vec{f'}(\theta)}{|\vec{f'}(\theta)|}$$

The Curvature vector of $\vec{f}(\theta)$ is defined as:

$$\hat{K}(\theta) = \left| \frac{d\hat{T}(\theta)}{ds} \right| = \left| \frac{d\hat{T}(\theta)}{d\theta} \cdot \frac{d\theta}{ds} \right| =$$

$$\left| \frac{\frac{d(\hat{T}(\theta))}{d\theta}}{\frac{ds}{d\theta}} \right| = \left| \frac{\hat{T}'(\theta)}{|\vec{f'}(\theta)|} \right|$$

The Radius of Curvature is defined as:

$$R = \frac{1}{|\hat{K}(\theta)|}$$

When the equations which describe the path of a double helix are manipulated, a description of the radius of curvature with respect to theta ($\theta$) can be generated. I have found that the radius of curvature varies along the path of the double helix. The minimum radius of curvature is of interest for fiber lifetime considerations and attenuation purposes. I have found that if the laylength of the subunits is considerably greater than the laylength of the buffer tube (three times greater as a rule of thumb) one can assume that the minimum bend radius (radius of curvature) on the buffer tubes will occur at $\theta=0$. At $\theta=0$ description for the radius of curvature along a double helix reduces to the following:

$$ROC(0) = \frac{\left[R_w + R_s\left(1 + \frac{\tan(\delta)}{\tan(\beta)}\right)\right]^2 + [R_s(\cot(\beta) - \tan(\delta))]^2}{\left[R_w + \frac{\tan^2(\delta) R_s^2}{\sin^2(\beta) R_w} + R_s\left(2\frac{\tan(\delta)}{\tan(\beta)} + 1\right)\right]}$$

where the variables are as described previously.

In practice, a sub-unit of the disclosed distribution cable consists of five buffer tubes stranded around a sub-unit central member, a single helix. Several sub-units (generally six) are stranded about a single central sub-unit, forming a single helix-double helix configuration. A double helix is a complicated geometrical configuration. The radius of curvature (ROC or bend radius) of this geometrical shape can be determined at any point along the curve by manipulating a set of equations. Once the correct derivations have been performed on the equations, the bend radius of the curve will depend on certain parameters, which define the curve. See FIGS. 5, 6, and 7 and the paragraph entitled "Path Description of a Double Helix". Assuming that the fibers in the buffer tube (see FIG. 1) lie along the center of the buffer tube, the optical fibers are in a helix configuration.

Applicant has observed that the bend radius of the fiber is different at different points in the cable. Thus, laylengths of the buffer tubes in the subunit may be chosen in order to insure that the bend radius or ROC of the fiber remain above 70 mm at all points in the cable. Historically 70 mm has been the preferred bend radius of a fiber, proof tested to 50 kpsi, to insure the fiber would be mechanically stable for the life expectancy of the cable. Tighter bend radii increases the risk of fiber breaks during the life of the cable in the field. Typically the fiber used in loose tube cables is proof tested to 50 kpsi. Using the equations described below with computer generated solutions, Applicant found a better solution: a buffer tube lay length of 100 mm for the outside sub-units, buffer tube lay length of 95 mm for the inside sub-unit, and a subunit lay length of 900 mm.

What is claimed is:

1. A high count optical fiber distribution cable having optical fiber attenuation stability over a range of temperatures comprising:
   (a) a center sub-unit comprising a sub-unit center strength member and at least one buffer tube stranded about said center sub-unit forming a single helix, said center strength member having a tensile strength of at least 4,350,000 psi and a coefficient of thermal expansion of no more than $25 \times 10^6$ Cm/Cm/°C.;
   (b) one or more additional sub-units stranded about the center sub-unit each additional sub-unit comprising at least one buffer tube stranded in a double helix configuration and a sub-unit strength member, each buffer tube stranded about said sub-unit strength member and each sub-unit strength member having a tensile strength of at least 4,350,000 psi and a coefficient of thermal expansion of no more than $25 \times 10^6$ Cm/Cm/°C.; and,
   (c) 300 or more elongated optical fibers, in one or more of said buffer tubes, that vary no more than 0.2 db/km in attenuation when said high count optical fiber distribution cable is subjected to temperatures between $-40°$ and $70°$ C. at wavelengths of 1310 nm and 1550 nm.

2. The distribution cable of claim wherein the number of optical fibers is between 300 and 420.

3. The distribution cable of claim 1 further including a first jacket circumscribing only the center sub-unit.

4. The distribution cable of claim 3 further including a second jacket circumscribing the additional sub-units.

5. The distribution cable of claim 4 further including a plurality of additional strength members disposed between the sub-units and the first jacket.

6. The distribution cable of claim 1 wherein each sub-unit contains a plurality of buffer tubes.

7. The distribution cable of claim 6 wherein at least one sub-unit contains an elongated cylindrical member stranded about the sub-unit's strength member.

8. The distribution cable of claim 6 wherein each tube bears a mark to distinguish it from other tubes in other sub-units.

9. The distribution cable of claim 8 wherein said mark is a color.

10. The distribution cable of claim 1 wherein each sub-unit bears a mark to distinguish it from other sub-units.

11. The distribution cable of claim 10 wherein said mark is a color.

* * * * *